(12) United States Patent
Bibeau

(10) Patent No.: US 9,409,345 B1
(45) Date of Patent: Aug. 9, 2016

(54) METHOD AND APPARATUS FOR FORMING VINYL WINDOW CORNERS

(71) Applicant: Dennis Bibeau, Swansea, MA (US)

(72) Inventor: Dennis Bibeau, Swansea, MA (US)

( * ) Notice: Subject to any disclaimer, the term of this patent is extended or adjusted under 35 U.S.C. 154(b) by 0 days.

(21) Appl. No.: 14/861,134

(22) Filed: Sep. 22, 2015

(51) Int. Cl.
*B29C 65/20* (2006.01)
*B29C 65/00* (2006.01)
*B29L 12/00* (2006.01)
*B29L 31/00* (2006.01)

(52) U.S. Cl.
CPC ............. *B29C 65/20* (2013.01); *B29C 66/0044* (2013.01); *B29C 66/5243* (2013.01); *B29L 2012/00* (2013.01); *B29L 2031/778* (2013.01)

(58) Field of Classification Search
CPC  B29C 65/20; B29C 65/2061; B29C 65/2007; B29C 65/2053; B29C 65/2092; B29C 66/5243; B29C 66/52431; B29C 66/1162; B29C 66/0044; B29C 65/2076; B29C 66/00441; B05B 15/0456
USPC ................................ 156/291, 289, 323, 583.1
See application file for complete search history.

(56) References Cited

U.S. PATENT DOCUMENTS 3,752,304 A * 8/1973 Alef .................... B05B 15/0456
118/505
4,981,546 A * 1/1991 Bergevin ............... B29C 65/226
156/515
5,631,055 A * 5/1997 Vines .................. B05B 15/0456
118/504

FOREIGN PATENT DOCUMENTS

DE  19529852 B4 *  3/2004
GB  2350318 A  *  11/2000
JP  2007136941 A  *  6/2007

OTHER PUBLICATIONS

Machine translation of JP 2007136941 date unknown.*

* cited by examiner

*Primary Examiner* — John Goff
(74) *Attorney, Agent, or Firm* — Salter & Michaelson

(57) ABSTRACT

A system and method for fabricating the corner of a plastic window frame. The system includes a metal platen having opposed sides and that is for heating and melting adjacently disposed frame pieces by being inserted between the adjacently disposed frame pieces as the adjacently disposed frame pieces are brought into contact with respective opposed sides of the metal platen in order to melt adjacent surfaces of the adjacently disposed frame pieces. The adjacently disposed frame pieces, once heated and melted, are drawn together to form the corner of the vinyl window frame. A release layer is secured to the opposed sides of the metal platen and disposed between the respective adjacently disposed frame pieces and the opposed sides of the metal platen to prevent adherence between the metal platen and frame pieces. The release layer is comprised of a release film having a work area corresponding to an area where the adjacently disposed frame pieces are to be joined and a non-work area outside of the work area, and at least one adhesive strip is disposed within the non-work area for securing the release film to the metal platen while the work area is absent any adhesive between the release layer and the metal platen.

8 Claims, 5 Drawing Sheets

METHOD AND APPARATUS FOR FORMING VINYL WINDOW CORNERS

FIELD OF THE INVENTION

The present invention relates to a system and associated method for fabricating the corner of a plastic window frame that is used in the window industry particularly for the manufacture of vinyl windows. More particularly, the present invention pertains to an improved system and associated method for fabricating the corner of a plastic window frame in which the process can be carried out more efficiently.

BACKGROUND OF THE INVENTION

The current way the window industry manufactures vinyl or plastic windows, first involves the welding together of the corners of the vinyl window. They do this by heating the corners to melt the vinyl and then they press the corner pieces together to form a joint. When the vinyl hardens and bonds the corner this is typically known as welding. In the known method an aluminum platen is used and is heated to approximately 400-500 degrees F. to heat the separate vinyl pieces to form a vinyl corner. The vinyl pieces are pressed against the heated platen to melt the end of each vinyl piece. The corner pieces being welded are usually formed with and end 45 degree surface. To perform this method one has to use a release material between the vinyl piece and the platen, so as to not have the vinyl stick to the platen which is typically constructed of a metal such as aluminum.

Currently there are basically two ways the industry accomplishes this release material or layer. One way is to provide the platen with a mechanism to secure a Teflon (polytetrafluoroethylene) coated fiberglass pad to the platen. Only about 10% of the welding machines have this option. Another way that is most popular is where one secures a Teflon coated fiberglass tape. Such tapes are used in approximately 90% of the applications. In both situations one has to cut the Teflon coated fiberglass material into separate pieces to cover the platen. In order to get a good weld the surface of the platen has to be perfectly smooth. If something gets behind the Teflon coated fiberglass pad or tape there will be a defect in the weld and this will cause the window to be rejected. Successive contact of the vinyl pieces with the platen at the work area can cause a tearing of the release material.

Currently, the only way one can purchase the tape is with the adhesive covering all of one side of the tape. When the tape or pad becomes worn the weld deteriorates and the pad or tape then has to be replaced. It is worn when the pad or tape will tear and vinyl leaks to the aluminum platen. This typically forms a lump that, in turn, causes a rejected window component. When replacing a worn tape, upon peeling the tape off the platen, most of the time the adhesive on the tape sticks to the aluminum platen. This is an undesirable situation. This sticking to the platen is because the adhesive sticks readily to the aluminum platen. Then the adhesive causes a lump that has to be removed. This means that extra time needs to be taken to clean each platen. This can be very costly in labor and machine down time.

Accordingly, it is object of the present invention to overcome the above prior art drawbacks to provide an improved system and associated method for fabricating the corner of a plastic window frame in which the process can be carried out more efficiently.

Another object of the present invention is to provide an improved system and associated method for fabricating the corner of a plastic window frame in the manufacture of a vinyl window, and in which a greater number of window frames can be fabricated before the platen has to be cleaned.

SUMMARY OF THE INVENTION

To accomplish the foregoing and other objects, features and advantages of the present invention there is provided a system for fabricating the corner of a plastic window frame. The system comprises a metal platen having opposed sides and that is for heating and melting adjacently disposed frame pieces by being inserted between the adjacently disposed frame pieces as the adjacently disposed frame pieces are brought into contact with respective opposed sides of the metal platen in order to melt adjacent surfaces of the adjacently disposed frame pieces. The adjacently disposed frame pieces, once heated and melted, are drawn together to form the corner of the vinyl window frame. A release layer is secured to the opposed sides of the metal platen and disposed between the respective adjacently disposed frame pieces and the opposed sides of the metal platen to prevent adherence between the metal platen and frame pieces. The release layer is comprised of a release film having a work area corresponding to an area where the adjacently disposed frame pieces are to be joined and a non-work area outside of the work area. At least one adhesive strip is disposed within the non-work area for securing the release film to the metal platen while the work area is absent any adhesive between the release layer and the metal platen.

In accordance with other aspects of the present invention the release film is comprised of a Teflon impregnated fiberglass film, and is disposed only in the non-work area of the release film; each frame piece comprises a vinyl frame piece; including a source for heating the metal platen; the source heats the metal platen to a temperature in a range of 400-500 degree F.; the metal platen is an aluminum platen; including a plurality of adhesive strips; wherein the adhesive strips are arranged to be disposed in a border pattern about at least three sides of the work area; wherein there are three separate adhesive strips with two of the adhesive strips disposed across from each other and the third adhesive strip disposed substantially transverse to the two adhesive strips; and wherein a width of the metal platen is greater than a thickness of each adjacently disposed frame piece.

Another embodiment of the present invention pertains to a method of fabricating the corner of a plastic window frame. The method employs a metal platen having opposed sides and that is for heating and melting adjacently disposed frame pieces by being inserted between the adjacently disposed frame pieces as the adjacently disposed frame pieces are brought into contact with respective opposed sides of the metal platen in order to melt adjacent surfaces of the adjacently disposed frame pieces. The adjacently disposed frame pieces, once heated and melted, are drawn together to form the corner of the vinyl window frame. Next is securing a release layer to the opposed sides of the metal platen so as to dispose the release layer between the respective adjacently disposed frame pieces and the opposed sides of the metal platen to prevent adherence between the metal platen and frame pieces. The release layer is comprised of a release film having a work area corresponding to an area where the adjacently disposed frame pieces are to be joined and a non-work area outside of the work area, and securing at least one adhesive strip to the release film and disposed within the non-work area for securing the release film to the metal platen while the work area is absent any adhesive between the release layer and the metal platen.

In accordance with other aspects of the present invention the release film is comprised of a Teflon impregnated fiberglass film, and is disposed only in the non-work area of the release film; each frame piece comprises a vinyl frame piece; including providing a source for heating the metal platen; the source heats the metal platen to a temperature in a range of 400-500 degree F.; the metal platen is an aluminum platen; including securing a plurality of adhesive strips; wherein the adhesive strips are arranged to be disposed in a border pattern about at least three sides of the work area; wherein there are three separate adhesive strips with two of the adhesive strips disposed across from each other and the third adhesive strip disposed substantially transverse to the two adhesive strips; and wherein a width of the metal platen is greater than a thickness of each adjacently disposed frame piece.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 1:
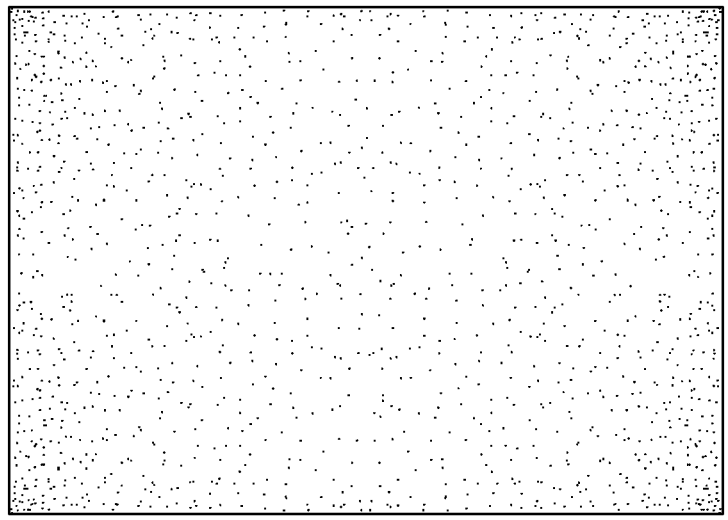
FIG. 1 is a schematic diagram of one side of a release layer found in the prior art in which an adhesive is applied to one complete side of the release layer or film.
Figure 2:
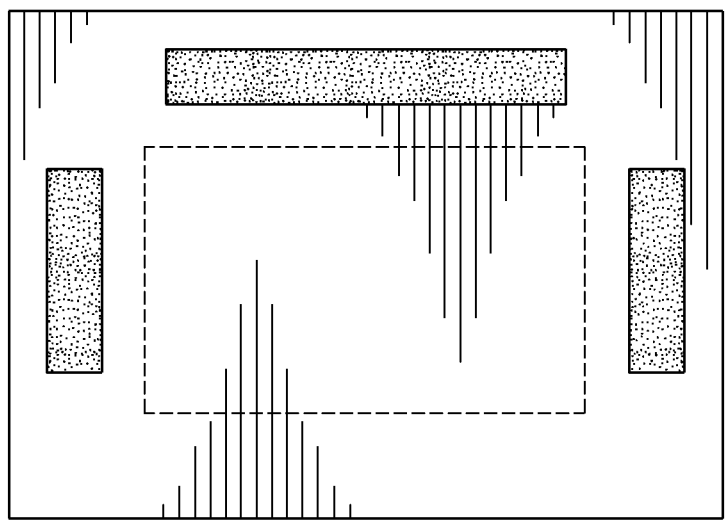
FIG. 2 is a schematic diagram of a release film in accordance with the present invention in which there is a work area corresponding to an area where the adjacently disposed frame pieces are to be joined and a non-work area outside of the work area, and illustrating at least one adhesive strip disposed within the non-work area for securing the release film to the metal platen while the work area is absent any adhesive between the release layer and the metal platen.

To accomplish the foregoing and other objects, features and advantages of the present invention there is provided a system, and associated method, for fabricating the corner of a plastic window frame that is used in the window industry particularly for the manufacture of vinyl windows. The concept of the present invention involves realizing that the problem of the tape sticking to the platen can be overcome by using no securing adhesive in the work area where the vinyl frame pieces engages against opposite sides of the platen. Thus, the securing adhesive is only disposed around the perimeter of the release film such as shown in FIG. 2 in order to secure the release film to the platen. FIG. 1 shows what is presently available wherein the release layer or film 10 has an adhesive 12 applied to only one side thereof. This is the typical form of the release film presently used. To do this one has to etch the Teflon coated fiberglass where the tape or adhesive is to be applied. The procedure to etch the material can be quite hazardous having a fan system for exhausting the fumes and the operator needing to have a respirator, special gloves, and a special apron. In accordance with the present invention one can use the film layer, as is, before the etching step. This is coupled with applying one or more adhesive strips only in the non-working area. Having no adhesive in the work area 30 of the tape, there won't be any adhesive stuck on the aluminum platen 40 in the work area of the tape. This translates into the ability to be able to form a greater number of frames using a single release material. This will save many hours of labor and machine down time.

Figure 3:
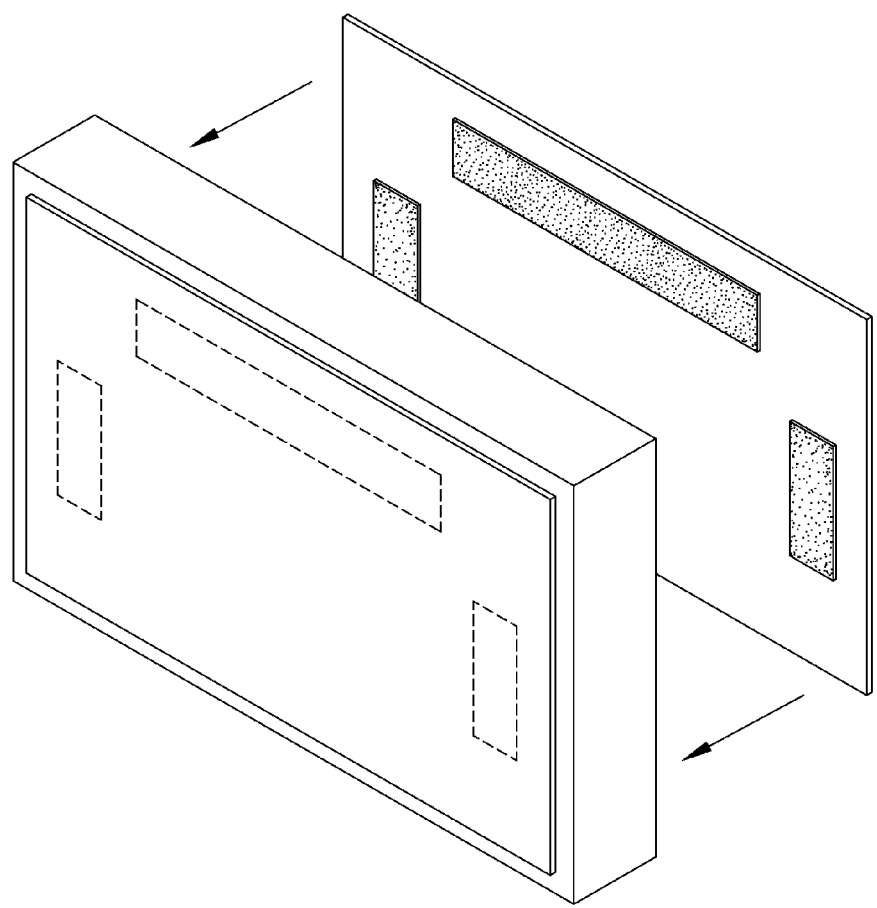
FIG. 3 is a perspective view of a release film as shown applied to opposed sides of the platen.
Figure 4:
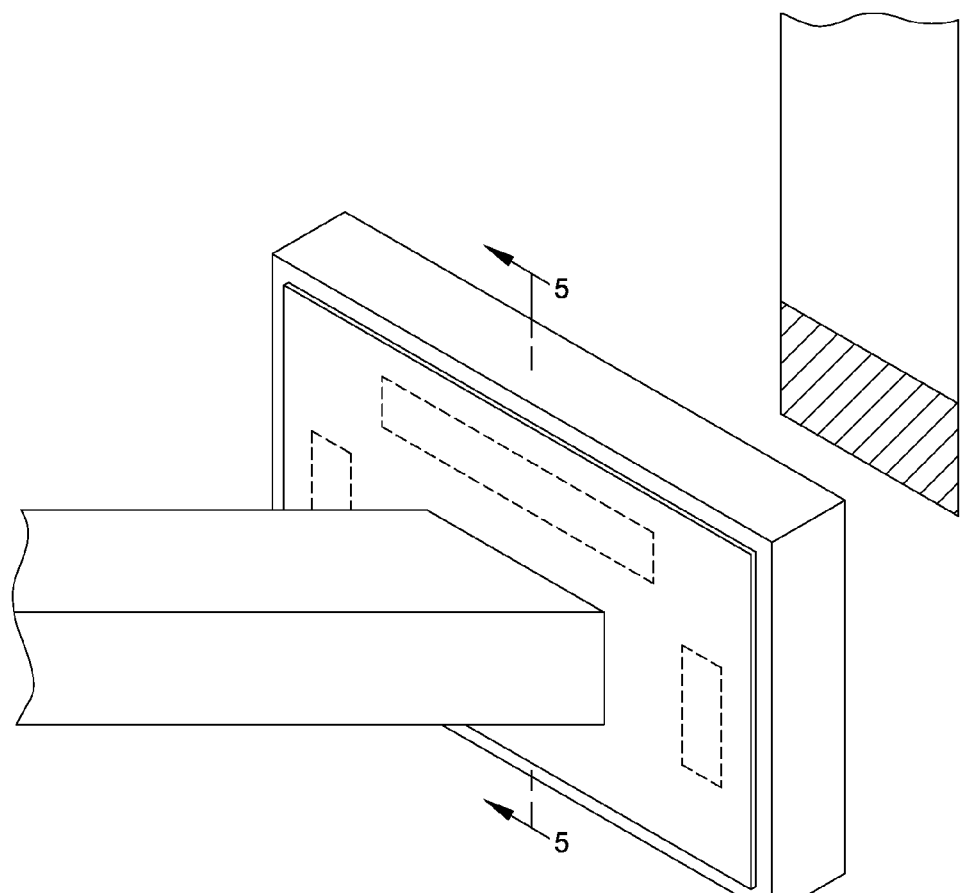
FIG. 4 is a fragmentary perspective view like that shown in FIG. 3 but with the platen being shown as disposed between the separate vinyl pieces being welded.
Figure 5:
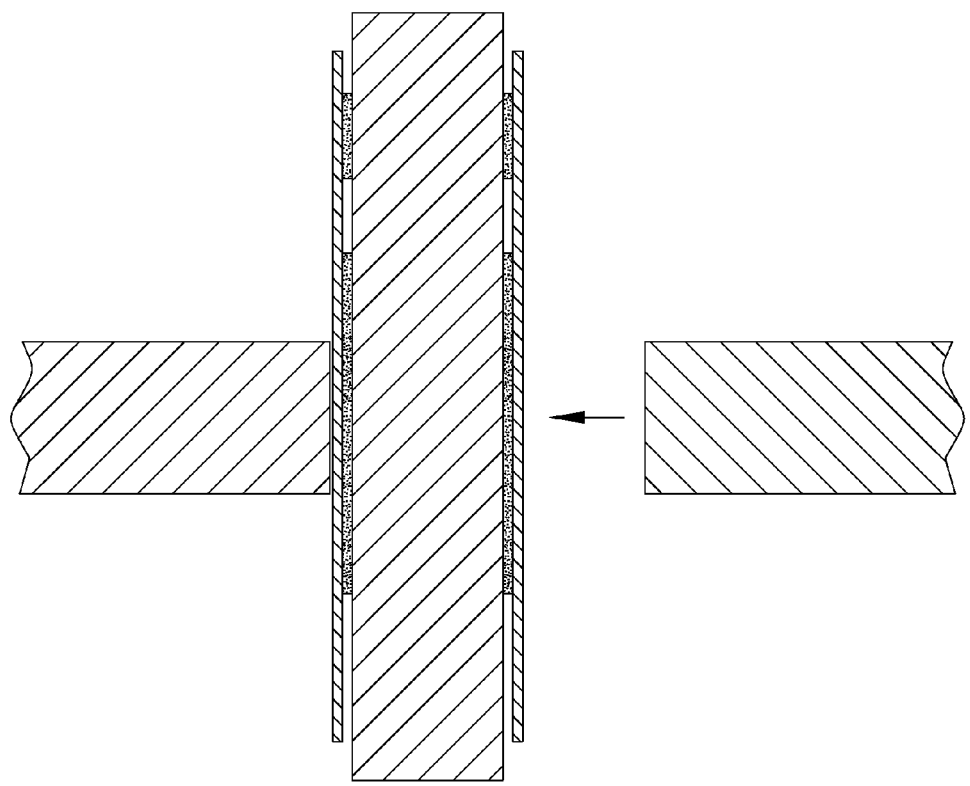
FIG. 5 is a cross-sectional view taken along lone 5-5 of FIG. 4.

Referring now to FIG. 2 this illustrates a release film 20 having a work area 30 and a non-work area 32 which may be considered as located around the perimeter of the work area 30. In FIG. 2 the work area is illustrated by the dotted outline. This work area 30 usually corresponds in dimensions to the area of the end of respective vinyl pieces being welded. Thus, the system comprises a metal platen 40 having opposed flat sides 42 and that is for heating and melting adjacently disposed frame pieces 50 by being inserted between the adjacently disposed frame pieces as the adjacently disposed frame pieces are brought into contact with respective opposed sides 42 of the metal platen 40 in order to melt adjacent surfaces 52 of the adjacently disposed frame pieces 50. Refer to FIGS. 3-5. The adjacently disposed frame pieces, once heated and melted, are drawn together to form the corner of the vinyl window frame. The release layer 20 is secured to the opposed sides 42 of the metal platen 40 and disposed between the respective adjacently disposed frame pieces 50 and the opposed sides 42 of the metal platen 40 to prevent adherence between the metal platen 40 and frame pieces 50. The release layer 20 is comprised of a release film having a work area 30 corresponding to an area where the adjacently disposed frame pieces 50 are to be joined and a non-work area 32 outside of the work area. At least one adhesive strip 60 is disposed within the non-work area 32 for securing the release film 20 to the metal platen 40 while the work area 30 is absent any adhesive between the release layer 20 and the metal platen 40.

The release layer or film 20 is constructed of a fiberglass material that has been infused or impregnated with Teflon. The adhesive strips 60 are preferably separate strips that can be made of a double-sided tape with a peel-off material on at least one side of the film. The tape is of a type that can withstand the high heats used with the platen; in a range of 400-500 degrees F. Each of these strips 60 may be applied directly to the release film 20. The release film 20 may be manufactured with the one side etched so that the strips can be effectively applied to the release film in the non-work area 32. FIGS. 1-3 illustrate the platen 40 and the opposed position release films 20. FIG. 4 is a perspective view like that illustrated in FIG. 3, but also showing the relative position between the vinyl end pieces 50 and the platen and release film. FIG. 5 is a cross-sectional view taken along lone 5-5 of FIG. 4. In FIG. 5 this view clearly illustrates the work and non-work areas with, for the purpose of illustration, one of the vinyl pieces 50 pressed against the release film 20 and the other vinyl piece 50 shown exploded away from the platen 40.

Figure 6:
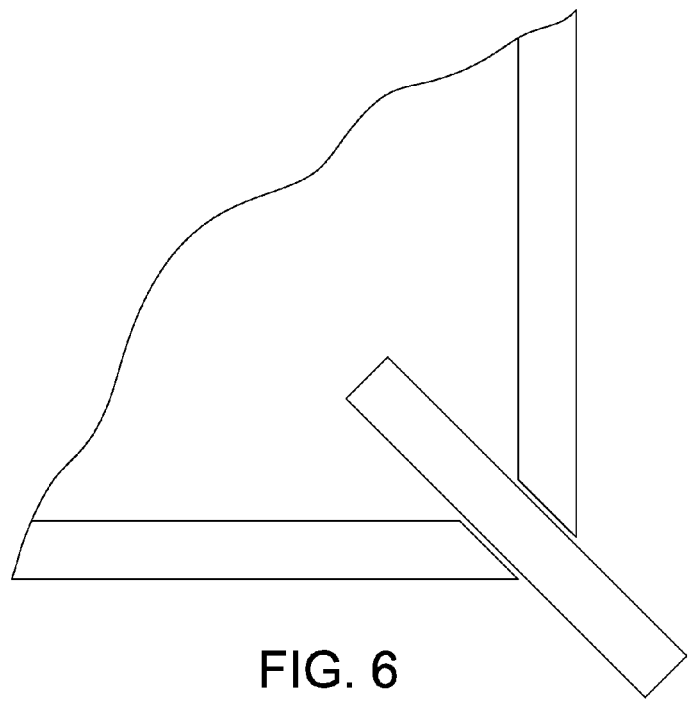
FIG. 6 is a schematic representation of one step in practicing the method of the present invention and in which the platen is illustrated as disposed between the vinyl pieces for heating the adjacent ends of the vinyl pieces.
Figure 7:
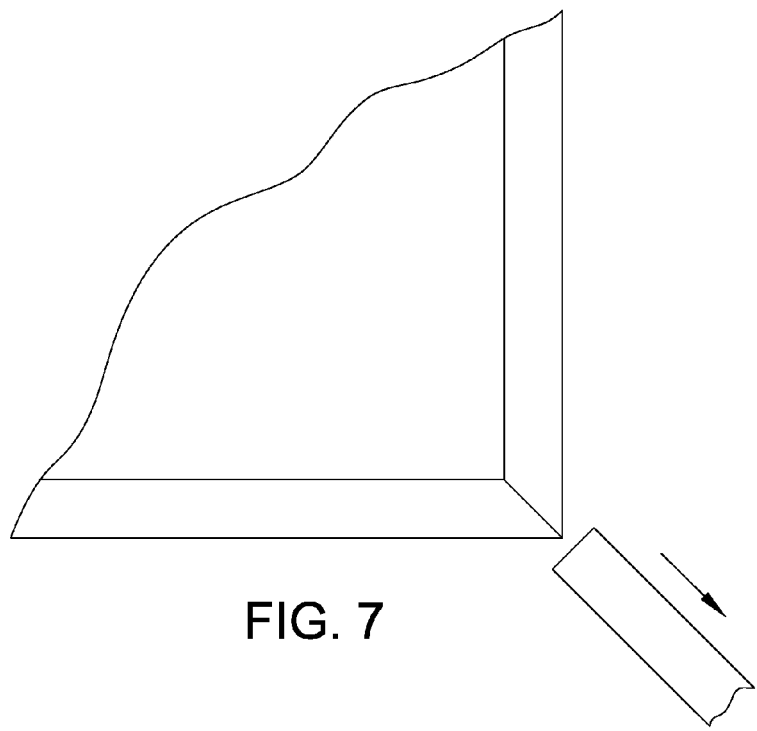
FIG. 7 is a schematic representation of a further step in practicing the method of the present invention and in which the platen is illustrated as having been withdrawn from between the vinyl pieces, and the vinyl pieces having been brought together to form the corner joint.

In operation, the vinyl pieces can be controlled in an automatic or semi-automatic manner to bring the vinyl pieces against the platen. In this regard refer to FIG. 6 for an illustration of the vinyl pieces 50 engaged against the platen 40. In FIGS. 6 and 7, for simplicity, the release film is not shown. FIG. 7 schematically illustrates a net step in the process wherein the platen has been withdrawn in the direction of arrow A and the two vinyl pieces have been brought together after being heated and melted. In the drawings three strips 60 are illustrated. The adhesive strips 60, such as illustrated in FIGS. 2 and 3 are arranged to be disposed in a border pattern about at least three sides of the work area 30 with one side of the work area free of adhesive. These three strips 60 may alternatively be in the form of a single strip of U-shape. The three separate adhesive strips 60 shown in FIG. 2 include two of the adhesive strips 60A disposed across from each other and the third adhesive strip 60B disposed substantially transverse to the two adhesive strips 60A.

The work area 30 may be considered as corresponding to the cross-section of the end surface 52 of respective frame pieces 50. One size of the work area is represented in FIG. 2 by the rectangular dotted area. FIG. 5 can also be considered as illustrating a work area 30 corresponding in size to the cross-section of the end surface or face 52. No adhesive is found in the work area 30.

In accordance with the present invention there is also provided a method of fabricating the corner of a plastic window frame. This method employs a metal platen 40 having opposed sides 42 and that is for heating and melting adjacently disposed frame pieces 50 by being inserted between the adjacently disposed frame pieces as the adjacently disposed frame pieces are brought into contact with respective opposed sides 42 of the metal platen 40 in order to melt adjacent surfaces 52 of the adjacently disposed frame pieces. The adjacently disposed frame pieces, once heated and melted, are drawn together to form the corner of the vinyl window frame. The next step is securing a release layer or film 20 to the opposed sides of the metal platen so as to dispose the release layer between the respective adjacently disposed frame pieces and the opposed sides of the metal platen to prevent adherence between the metal platen and frame pieces. The release layer comprises of a release film having a work area 30 corresponding to an area where the adjacently disposed frame pieces are to be joined and a non-work area 32 outside of the work area 30. The next step is securing at least one adhesive strip 60 to the release film 20 and disposed within the non-work area 32 for securing the release film 20 to the metal platen 40 while the work area 30 is absent any adhesive between the release layer and the metal platen.

Having now described a limited number of embodiments of the present invention, it should now be apparent to those skilled in the art that numerous other embodiments and modifications thereof are contemplated as falling within the scope of the present invention, as defined by the appended claims. For example, many different adhesive patterns may be used, as long as they are restricted to being applied only on the non-work area which is basically about the perimeter of the work area. At least one adhesive piece may be used but in order to maintain the release film secured it is preferred that at least one pair of opposed position adhesive strips may be used.

What is claimed is:

1. A system for fabricating the corner of a plastic window frame, said system comprising a metal platen having opposed sides and that is for heating and melting adjacently disposed frame pieces by being inserted between the adjacently disposed frame pieces as the adjacently disposed frame pieces are brought into contact with respective opposed sides of the metal platen in order to melt adjacent surfaces of the adjacently disposed frame pieces, said adjacently disposed frame pieces, once heated and melted, being drawn together to form the corner of the plastic window frame, a release layer secured to the opposed sides of the metal platen and disposed between the respective adjacently disposed frame pieces and the opposed sides of the metal platen to prevent adherence between the metal platen and frame pieces, said release layer comprised of a release film having a work area corresponding to an area where the adjacently disposed frame pieces are to be joined and a non-work area outside of the work area, and at least one adhesive strip disposed within the non-work area of the release film for securing the release film to the metal platen while the work area is absent any adhesive between the release layer and the metal platen, wherein the release film is comprised of a Teflon a polytetrafluoroethylene impregnated fiberglass film, and the at least one adhesive strip is disposed only in the non-work area of the release film, wherein each frame piece comprises a vinyl frame piece, wherein the metal platen is heated to a temperature in a range of 400-500 degree F., wherein the at least one adhesive strip is disposed in a border pattern about only three sides of the work area with one side of the work area free of adhesive, and wherein the at least one adhesive strip is comprised of three adhesive strip pieces with two of the adhesive strip pieces being disposed across from each other and the third adhesive strip piece being disposed substantially transverse to the two adhesive strip pieces.

2. The system of claim 1 wherein the metal platen is an aluminum platen.

3. The system of claim 1 wherein the three adhesive strip pieces are respectively separated from each other.

4. The system of claim 1 wherein a width of the metal platen is greater than a thickness of each adjacently disposed frame piece.

5. A method of fabricating the corner of a plastic window frame, said method employing a metal platen having opposed sides and that heats and melts adjacently disposed frame pieces by being inserted between the adjacently disposed frame pieces as the adjacently disposed frame pieces are brought into contact with respective opposed sides of the metal platen in order to melt adjacent surfaces of the adjacently disposed frame pieces, said adjacently disposed frame pieces, once heated and melted, being drawn together to form the corner of the plastic window frame, securing a release layer to the opposed sides of the metal platen so as to dispose the release layer between the respective adjacently disposed frame pieces and the opposed sides of the metal platen to prevent adherence between the metal platen and frame pieces, said release layer comprised of a release film having a work area corresponding to an area where the adjacently disposed frame pieces are to be joined and a non-work area outside of the work area, and securing at least one adhesive strip to the release film and disposed within the non-work area for securing the release film to the metal platen while the work area is absent any adhesive between the release layer and the metal platen, wherein the release film is comprised of a Teflon a polytetrafluoroethylene impregnated fiberglass film, and the at least one adhesive strip is disposed only in the non-work area of the release film, wherein each frame piece comprises a vinyl frame piece, wherein the metal platen is heated to a temperature in a range of 400-500 degree F., wherein the at least one adhesive strip is disposed in a border pattern about only three sides of the work area with one side of the work area free of adhesive, and wherein the at least one adhesive strip is comprised of three adhesive strip pieces with two of the adhesive strip pieces being disposed across from each other and the third adhesive strip piece being disposed substantially transverse to the two adhesive strip pieces.

6. The method of claim 5 wherein the metal platen is an aluminum platen.

7. The method of claim 5 wherein the three adhesive strip pieces are respectively separated from each other.

8. The method of claim 5 wherein a width of the metal platen is greater than a thickness of each adjacently disposed frame piece.

* * * * *